United States Patent
Liu

(10) Patent No.: US 7,990,418 B2
(45) Date of Patent: Aug. 2, 2011

(54) AUTOMATED TEST MEASUREMENT SYSTEM AND METHOD THEREFOR

(75) Inventor: Pai-Chen Liu, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 1251 days.

(21) Appl. No.: 11/616,872

(22) Filed: Dec. 28, 2006

(65) Prior Publication Data

US 2008/0036865 A1     Feb. 14, 2008

(30) Foreign Application Priority Data

Aug. 11, 2006 (CN) .......................... 2006 1 0062070

(51) Int. Cl.
*H04N 17/00* (2006.01)

(52) U.S. Cl. ........ 348/180; 348/181; 348/189; 348/192; 348/175; 348/177; 725/110

(58) Field of Classification Search .................. 348/180, 348/181, 175, 177, 183, 189, 192; 375/224; 370/241; 725/107, 131, 139, 110
See application file for complete search history.

(56) References Cited

U.S. PATENT DOCUMENTS

| 6,996,068 | B1 | 2/2006 | Sherlock |
| 2006/0126725 | A1 | 6/2006 | Zeng et al. |
| 2008/0022339 | A1* | 1/2008 | Montreuil et al. ............ 725/108 |

FOREIGN PATENT DOCUMENTS

CN       1635801       7/2005

* cited by examiner

*Primary Examiner* — M. Lee
*Assistant Examiner* — Jean W Désir
(74) *Attorney, Agent, or Firm* — Wei Te Chung

(57) ABSTRACT

An automated test measurement system (ATMS) (100), for automatically measuring a device under test (DUT) (60), includes a control module (110), a signal generation module (120), an encoder module (130), and a signal analyzer module (140). The control module receives an encoder parameter and a test item, and generates a pattern command and an analyzer command according to the test item. The signal generation module generates a pattern according to the pattern command. The encoder module transforms the pattern into a bitstream according to the encoder parameter, and transmits the bitstream to the DUT. The bitstream is then transformed into a test signal. The analyzer module receives the test signal from the DUT, and analyzes the test signal according to the analyzer command. An automated test measurement method therefor is also provided.

12 Claims, 8 Drawing Sheets

AUTOMATED TEST MEASUREMENT SYSTEM AND METHOD THEREFOR

BACKGROUND OF THE INVENTION

1. Field of the Invention

The invention relates to test systems and methods, and particularly to an automated test measurement system and method therefor.

2. Description of Related Art

With the transition from analog to digital broadcast televisions (TVs), set-top boxes (STBs) are widely used in various TV systems, such as digital satellite TV systems, digital cable TV systems, digital terrestrial TV systems, and etc.

As is well known, STBs must be tested to ensure proper functioning for commercial use before widespread deployment. In a conventional method, the STBs are mostly manually tested. However, it is a complex and time-consuming job for many engineers to test the STBs. The tests for the STBs, for example, include signal-to-noise ratio, sync amplitude, bar amplitude, and frequency response tests. In most cases, experience of test engineers and the kinds of test tools they use are factors in how long it takes to test each STB, which may take hours, days, or even weeks.

SUMMARY OF THE INVENTION

An exemplary embodiment of the present invention provides an automated test measurement system (ATMS) that automatically measures performance of a device under test (DUT). The ATMS includes a control module, a signal generation module, an encoder module, and a signal analyzer module. The control module receives an encoder parameter and a test item, and generates a pattern command and an analyzer command according to the test item. The signal generation module generates a pattern according to the pattern command. The encoder module transforms the pattern into a bitstream according to the encoder parameter, and transmits the bitstream to the DUT. The bitstream is then transformed into a test signal. The analyzer module receives the test signal from the DUT, and analyzes the test signal according to the analyzer command.

Another exemplary embodiment of the present invention provides an automated test measurement method for automatically measuring performance of a DUT. The automated test measurement method includes the following steps. An encoder parameter and a test item are received. A pattern command and an analyzer command are generated according to the test item. A pattern is generated according to the pattern command. The pattern is transformed into a bitstream according to the encoder parameter. The bitstream is transmitted to the DUT. The bitstream is then transformed into a test signal. The test signal is received from the DUT and analyzed according to the analyzer command.

Other advantages and novel features will become more apparent from the following detailed description when taken in conjunction with the accompanying drawings, in which:

DETAILED DESCRIPTION OF THE INVENTION

Figure 1:
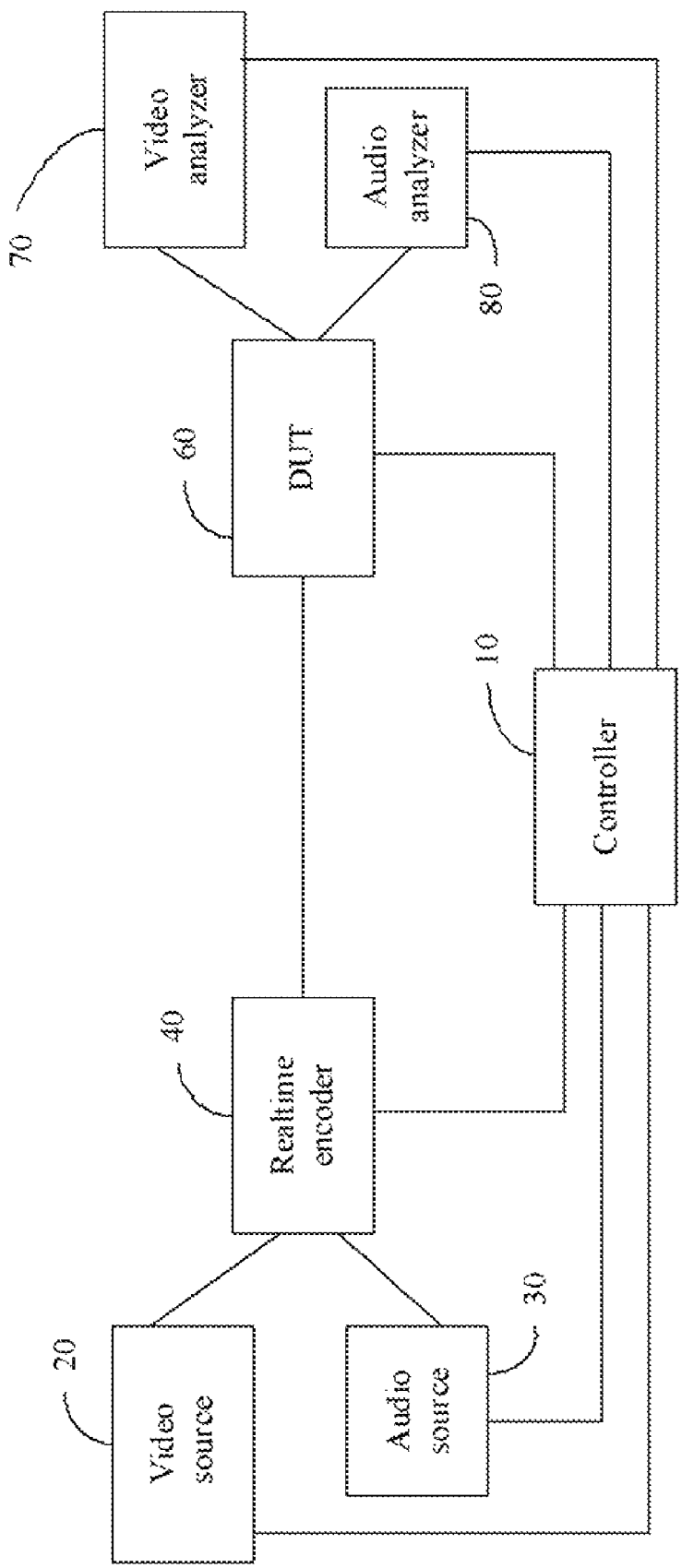
FIG. 1 is a schematic diagram of an application environment of an automated test measurement system (ATMS) of an exemplary embodiment of the present invention.

FIG. 1 is a schematic diagram of an application environment of an automated test measurement system (ATMS) of an exemplary embodiment of the present invention. In the exemplary embodiment, the ATMS, for automatically measuring performance of a device under test (DUT) 60, includes a controller 10, a video source 20, an audio source 30, a realtime encoder 40, a video analyzer 70, and an audio analyzer 80. In this embodiment, the controller 10 may be a personal computer, and the DUT 60 may be a set-top box (STB).

In other embodiments, the controller 10 may be another control device, and the DUT 60 may be another decoder device.

In the exemplary embodiment, the controller 10, the video source 20, the audio source 30, the realtime encoder 40, the video analyzer 70, and the audio analyzer 80 automatically measure performance of the DUT 60, and thus, time for measuring performance of the DUT 60 is effectively reduced.

The controller 10 controls the video source 20 to generate a video pattern, controls the audio source 30 to generate an audio pattern, and controls the realtime encoder 40 to transform the video pattern and the audio pattern into a bitstream. The realtime encoder 40 then transmits the bitstream to the DUT 60. The DUT 60 transforms the bitstream into a video test signal and an audio test signal. The controller 10 further controls the video analyzer 70 to analyze the video test signal, and controls the audio analyzer 80 to analyze the audio test signal. Therefore, the ATMS automatically measures performance of the DUT 60 via the controller 10, the video source 20, the audio source 30, the realtime encoder 40, the video analyzer 70, and the audio analyzer 80, and as a result, time for measuring performance of the DUT 60 is reduced, thereby reducing time for products of the DUT 60 to be sent to market. In addition, the ATMS ensures reliability, repetition, and consistency of measurement results, although performance of the DUT 60 may be measured by different engineers at different sites.

Figure 2:
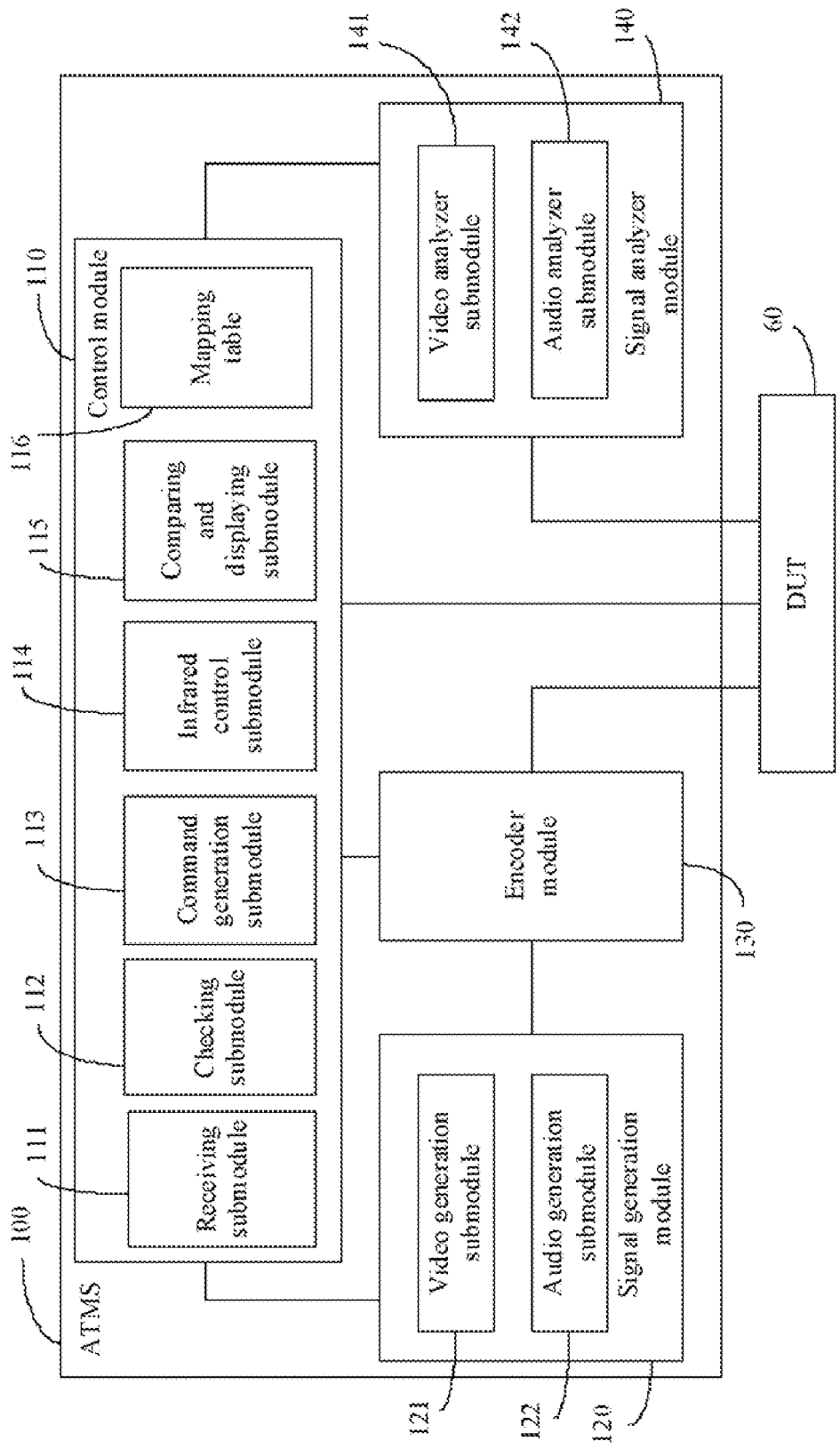
FIG. 2 is a schematic diagram of functional modules of an ATMS of another exemplary embodiment of the present invention.

FIG. 2 is a schematic diagram of functional modules of an ATMS 100 of an exemplary embodiment of the present invention. The ATMS 100 includes a control module 110, a signal generation module 120, an encoder module 130, and a signal analyzer module 140. The signal generation module 120 includes a video generation submodule 121 and an audio generation submodule 122. The signal analyzer module 140 includes a video analyzer submodule 141 and an audio analyzer submodule 142.

The ATMS 100 may be utilized in the application environment of FIG. 1. In the exemplary embodiment, the control module 110 is disposed in the controller 10 of FIG. 1, the video generation submodule 121 is disposed in the video source 20 of FIG. 1, the audio generation submodule 122 is disposed in the audio source 30 of FIG. 1, the encoder module 130 is disposed in the realtime encoder 40 of FIG. 1, the video analyzer submodule 141 is disposed in the video analyzer 70 of FIG. 1, and the audio analyzer submodule 142 is disposed in the audio analyzer 80 of FIG. 1.

In other embodiments, the above modules and submodules of the ATMS 100 may be disposed in one or more devices.

The control module 110 includes a receiving submodule 111, a checking submodule 112, a command generation submodule 113, an infrared control submodule 114, a comparing and displaying submodule 115, and a mapping table 116.

The receiving submodule 111 receives a check list, an encoder parameter, and a test item. In the exemplary embodiment, the receiving submodule 111 includes one or more user interfaces (UIs). The encoder parameter includes a video encoder parameter and an audio encoder parameter. The test item includes a video test item, an audio test item, and test criteria values of the test items.

In the exemplary embodiment, the video encoder parameter includes a video signal standard, a video CODEC, a video bit rate, a video resolution, and the like. The video signal standard includes a phase alternating line (PAL) standard and a national television standards committee (NTSC) standard. The video CODEC includes moving picture experts group-1 (MPEG-1), MPEG-2, MPEG-4, H.264, VC1, and so on. The video resolution includes full D1, half D1, and source interchange format (SIF), and the like.

The audio encoder parameter includes an audio CODEC, an audio bit rate, and an audio sample rate, and the like. The audio CODEC includes MPEG-1, MPEG-2, MPEG-4, advanced audio coding (AAC), and MPEG-1 layer 3 (MP3), and the like.

In other embodiments, the video encoder parameter and the audio encoder parameter may include more or less encoder parameters according to different designs. Each encoder parameter may include more or less types according to different designs.

In the exemplary embodiment, the video test item includes a color burst level, a signal-to-noise ratio, a sync amplitude, a bar amplitude, a frequency response, and the like. The audio test item includes an audio distortion, a total harmonic distortion+noise (THD+N), a dynamic range, a cross talk, a frequency response, and so on.

In other embodiments, the video test item and the audio test item may include more or less test items according to different designs.

In the exemplary embodiment, users can select and set the encoder parameter via the user interface of the receiving submodule 111, and then analyze the test items to know the performance of the DUT 60. For example, if MPEG-1 is selected for the video encoder parameter, the decoding capability of the DUT 60 for MPEG-1 can be known by analyzing the items included in the video test item.

The checking submodule 112 checks a connection state of the ATMS 100 according to the check list. In the exemplary embodiment, the checking submodule 112 checks connection states of the video source 20, the audio source 30, the realtime encoder 40, the DUT 60, the video analyzer 70, and the audio analyzer 80.

In another embodiment, the checking submodule 112 may only check connection states of one or more devices of the AMTS 100.

In a further embodiment, the checking submodule 112 may not check the connection state of the AMTS 100. Then the control module 100 may not include the checking submodule 112. Accordingly, the receiving submodule 111 may not receive the check list.

In the exemplary embodiment, the controller 10 controls the video source 20 via a general purpose interface bus (GPIB), controls the audio source 30 via an audio precision interface bus (APIB), controls the realtime encoder 40 via a simple network management protocol (SNMP), controls the DUT 60 via the infrared control submodule 114, controls the video analyzer 70 via another GPIB, and controls the audio analyzer 80 via another APIB. Correspondingly, the check list may include a GPIB address, an APIB address, waiting time, and other relevant information.

In other embodiments, the controller 10 may control the video source 20, the audio source 30, the realtime encoder 40, the DUT 60, the video analyzer 70, and the audio analyzer 80 via other control means. Correspondingly, the check list may include other relevant information according to different designs.

During the setup stage of the AMTS 100, users can input the check list via the user interface of the receiving submodule 110. The checking submodule 112 checks the connection state of each device of the ATMS 100, and then reports the connection state via the user interface, namely reporting the connection status is normal or abnormal. In this embodiment, the checking submodule 112 transmits request information to each device. If a reply is received from the device, the checking submodule 112 determines the connection state of the device is normal. If no reply is received from the device, the checking submodule 112 determines the connection state of the device is abnormal.

The mapping table 116 includes a mapping relationship between the test item and a pattern.

The command generation submodule 113 generates a pattern command and an analyzer command according to the test item.

The pattern command includes a video pattern command and an audio pattern command. The analyzer command includes a video analyzer command and an audio analyzer command.

In the exemplary embodiment, the command generation submodule 113 generates the video pattern command according to the video test item and the mapping table 116, generates the audio pattern command according to the audio test item and the mapping table 116, generates the video analyzer command according to the video test item, and generates the audio analyzer command according to the audio test item. The video pattern command informs the video generation submodule 121 what type of video pattern to generate. The audio pattern command informs the audio generation submodule 122 what type of audio pattern to generate. The video analyzer command informs the video analyzer submodule 141 to analyze the video test item. The audio analyzer command informs the audio analyzer submodule 142 to analyze the audio test item.

The infrared control submodule 114 communicates with and controls the DUT 60. In the exemplary embodiment, the infrared control submodule 114 may be an infrared fixture or device. During testing of the DUT 60, the infrared control submodule 114 transmits a control signal to the DUT 60 to initialize the DUT 60.

The function of the comparing and displaying submodule 115 will be described hereinafter.

The signal generation module 120 generates a pattern according to the pattern command. In the exemplary embodiment, the pattern includes a video pattern and an audio pattern. The video generation submodule 121 generates the video pattern according to the video pattern command. The audio generation submodule 122 generates the audio pattern according to the audio pattern command. In this embodiment, the video pattern and the audio pattern are analog signals.

The encoder module 130 transforms the pattern into a bitstream according to the encoder parameter. In the exemplary embodiment, the encoder parameter includes the video encoder parameter and the audio encoder parameter. The pattern includes the video pattern and the audio pattern. The encoder module 130 transforms the video pattern and the audio pattern into the bitstream according to the video encoder parameter and the audio encoder parameter. In this embodiment, the bitstream is a digital signal. The encoder module 130 then transmits the bitstream to the DUT 60.

In the exemplary embodiment, the infrared control submodule 114 transmits a control signal to the DUT 60 after the encoder module 130 transforms the pattern into the bitstream. The DUT 60 receives the control signal and initializes itself. Then the DUT 60 receives the bitstream, and transforms the bitstream into a test signal.

In other embodiments, the infrared control submodule 114 may transmit the control signal to the DUT 60 to initialize the DUT 60 before the encoder module 130 transforms the pattern into the bitstream.

The signal analyzer module 140 receives the test signal from the DUT 60, and analyzes the test signal according to the analyzer command. Then the signal analyzer module 140 transmits the analyzed results to the comparing and displaying submodule 115. In the exemplary embodiment, the analyzer command includes the video analyzer command and the audio analyzer command. The test signal includes a video test signal and an audio test signal.

The video analyzer submodule 141 receives the video test signal from the DUT 60, and analyzes the video test signal according to the video analyzer command. The audio analyzer submodule 142 receives the audio test signal from the DUT 60, and analyzes the audio test signal according to the audio analyzer command.

The comparing and displaying submodule 115 of the control module 110 compares the analyzed results and the test criteria values received by the receiving submodule 111, and displays test results. In the exemplary embodiment, if the analyzed result of one test item satisfies the test criteria value of the test item, the comparing and displaying submodule 115 displays a successful test result, for example, displaying "pass". If the analyzed result of one test item does not satisfy the test criteria value of the test item, the comparing and displaying submodule 115 displays an unsuccessful test result, for example, displaying "fail".

Figure 3:
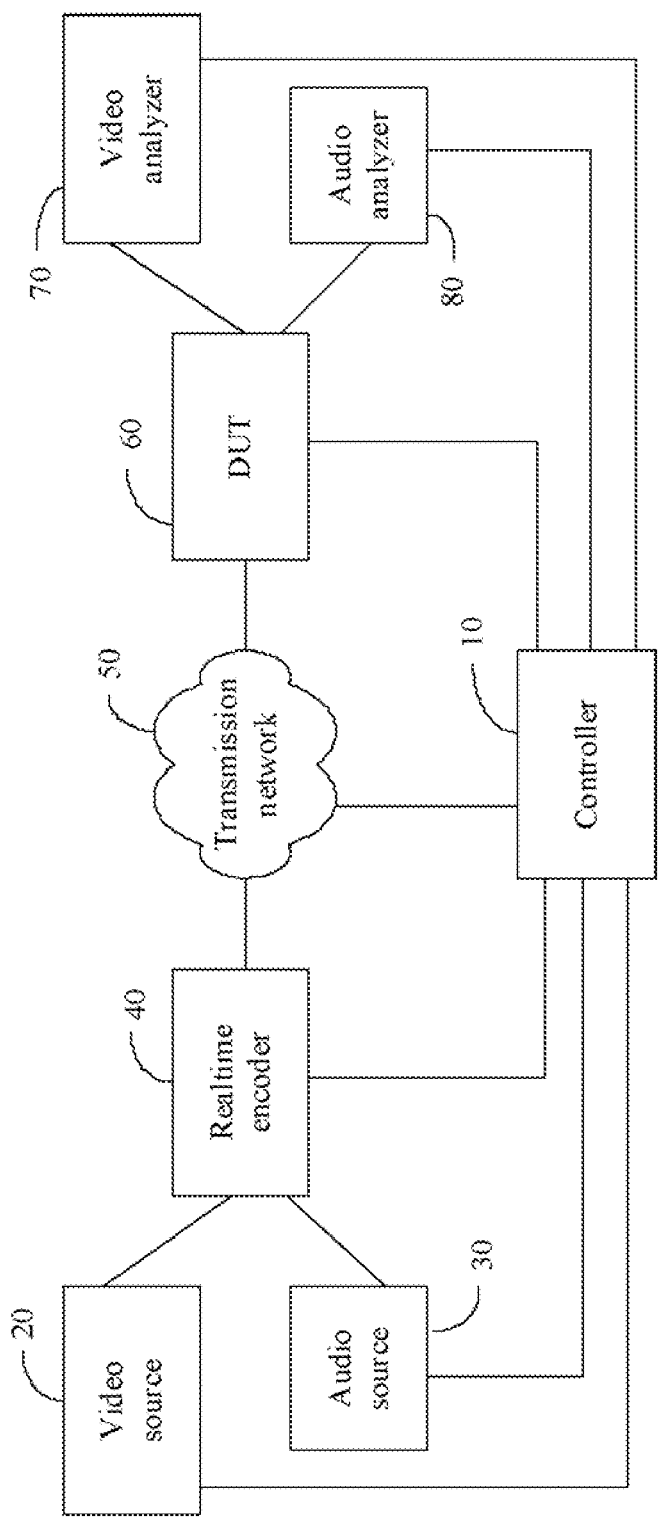
FIG. 3 is a schematic diagram of an application environment of an ATMS of a further exemplary embodiment of the present invention.

FIG. 3 is a schematic diagram of an application environment of an ATMS of another exemplary embodiment of the present invention. In the exemplary embodiment, the ATMS may be in a remote environment; for example, the device under test (DUT) and other devices are remotely connected. The ATMS of this embodiment is similar to the ATMS of FIG. 1, and the difference therebetween is that the ATMS of this embodiment further includes a transmission network 50. The controller 10 further controls the realtime encoder 40 to transmit the bitstream to the DUT 60 via the transmission network 50. Other devices of this embodiment are the same as those of FIG. 1, so descriptions are omitted.

Figure 4:
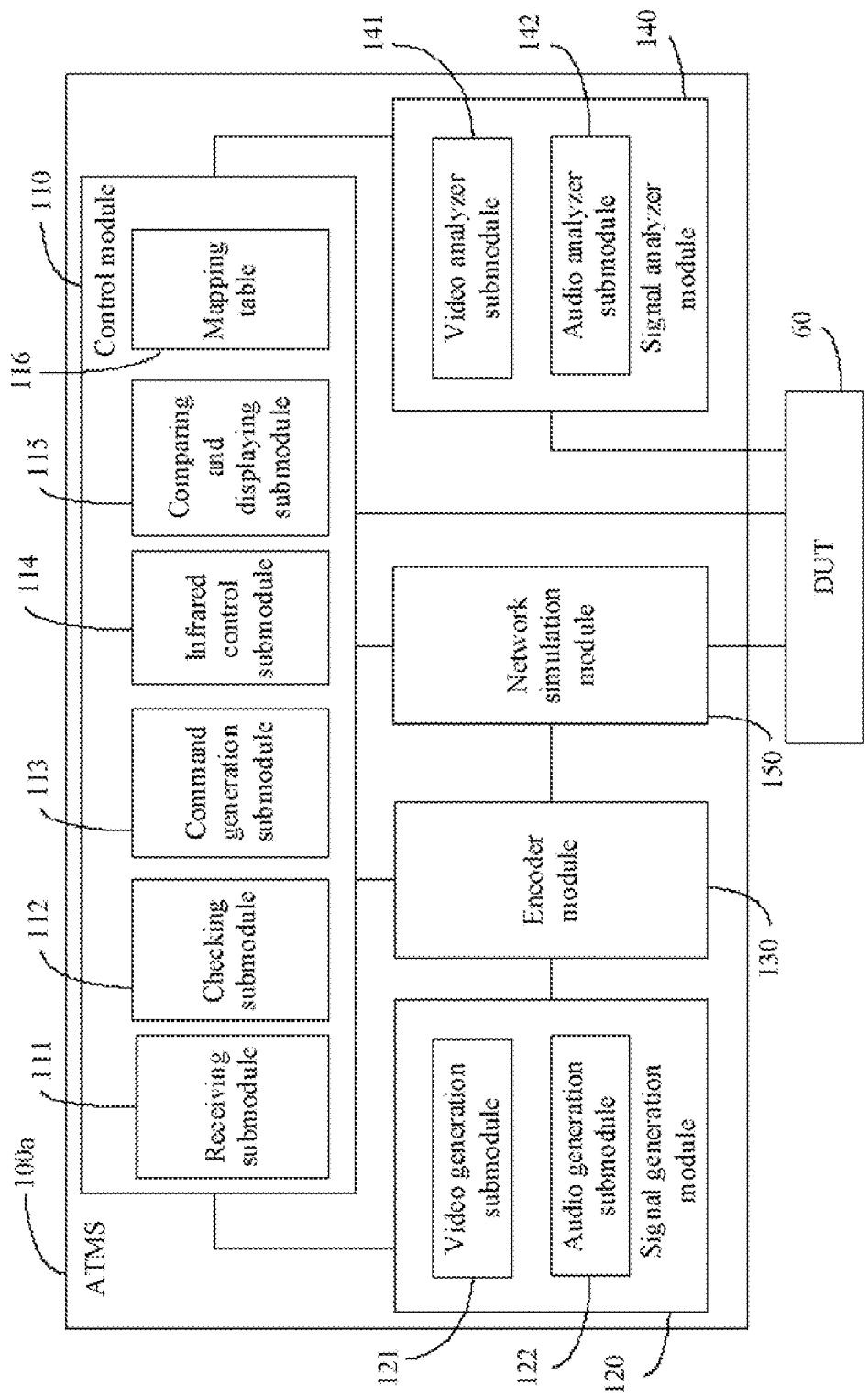
FIG. 4 is a schematic diagram of functional modules of an ATMS of a still further exemplary embodiment of the present invention.

FIG. 4 is a schematic diagram of functional modules of an ATMS 100a of another exemplary embodiment of the present invention. The ATMS 100a of this embodiment is similar to the ATMS 100 of FIG. 2, and the difference therebetween is that the ATMS 100a further includes a network simulation module 150. Other modules of this embodiment are the same as those of FIG. 2, so descriptions are omitted.

The ATMS 100a may be utilized in the application environment of FIG. 3. In the exemplary embodiment, the control module 100 is disposed in the controller 10 of FIG. 3, the video generation submodule 121 is disposed in the video source 20 of FIG. 3, the audio generation submodule 122 is disposed in the audio source 30 of FIG. 3, the encoder module 130 is disposed in the realtime encoder 40 of FIG. 3, the network simulation module 150 is disposed in the transmission network 50 of FIG. 3, the video analyzer submodule 141 is disposed in the video analyzer 70 of FIG. 3, and the audio analyzer submodule 142 is disposed in the audio analyzer 80 of FIG. 3.

In other embodiments, the modules or submodules of the ATMS 100a may be disposed in one or more devices.

In the exemplary embodiment, the receiving module 111 further receives a network test item via the user interface. The checking submodule 112 further checks a connection state of the transmission network 50. The command generation submodule 113 further generates a network command according to the network test item.

The network simulation module 150 transforms the bitstream into a network transmission signal to simulate the transmission network 50 according to the network command, and transmits the network transmission signal to the DUT 60. The DUT 60 then transforms the network transmission signal into a test signal.

In the exemplary embodiment, the transmission network 50 may be an Internet protocol (IP) network, a digital cable network, a digital terrestrial network, a satellite network, etc. Correspondingly, the network simulation network 150 can select an applicable channel or an applicable modulation method to transform the bitstream into the network transmission signal such as IP packets or modulation signals according to the network command.

Figure 5:
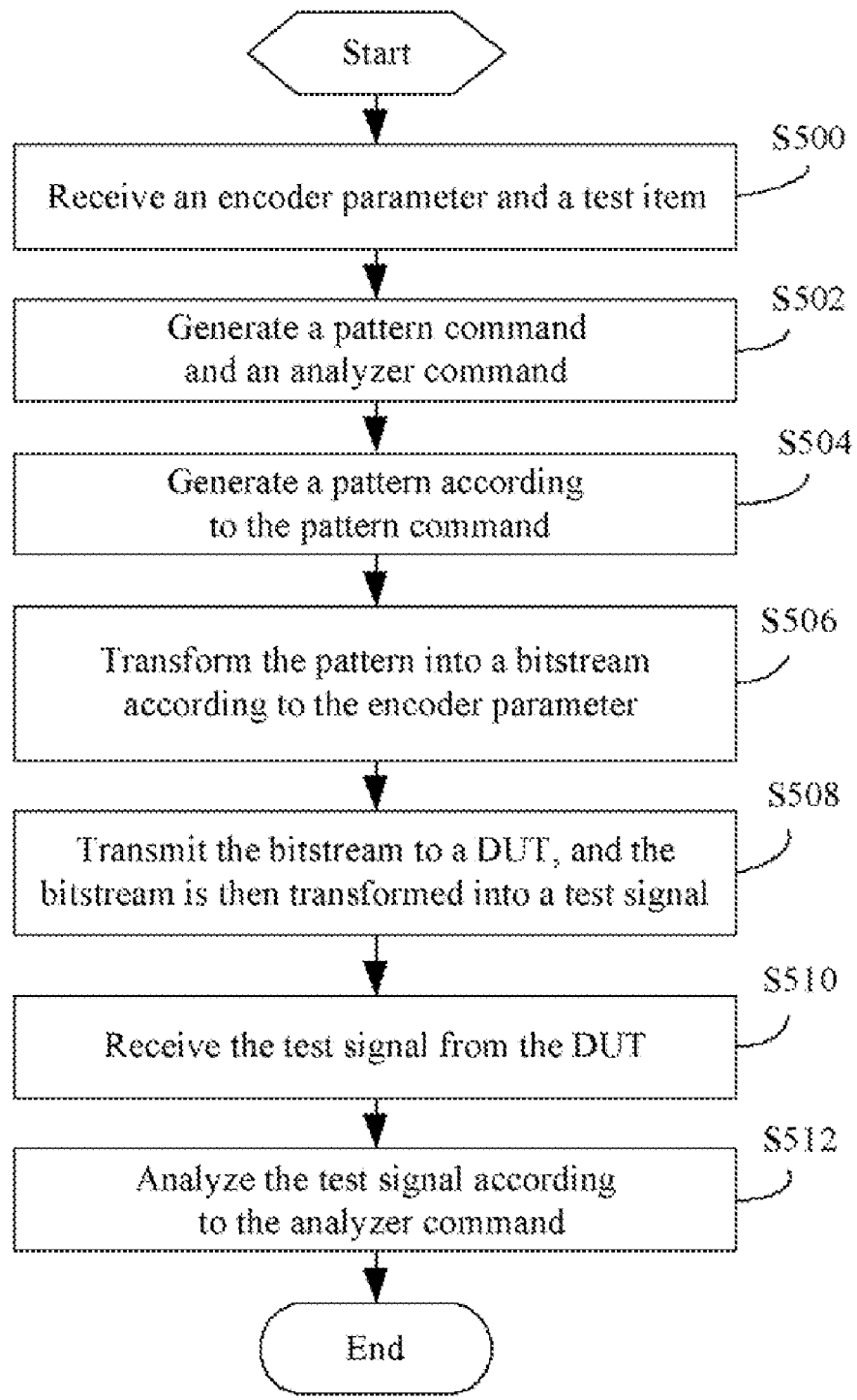
FIG. 5 is a flowchart of an automated test measurement method of a yet further exemplary embodiment of the present invention.

FIG. 5 is a flowchart of an automated test measurement method of an exemplary embodiment of the present invention.

In step S500, the control module 110 receives an encoder parameter and a test item. In step S502, the control module 110 generates a pattern command and an analyzer command according to the test item.

In step S504, the signal generation module 120 generates a pattern according to the pattern command. In step S506, the encoder module 130 transforms the pattern into a bitstream according to the encoder parameter. In step S508, the encoder module 130 transmits the bitstream to the DUT 60, and the bitstream is then transformed into a test signal.

In step S510, the signal analyzer module 140 receives the test signal from the DUT 60. In step S512, the signal analyzer module 140 analyzes the test signal according to the analyzer command.

Figure 6:
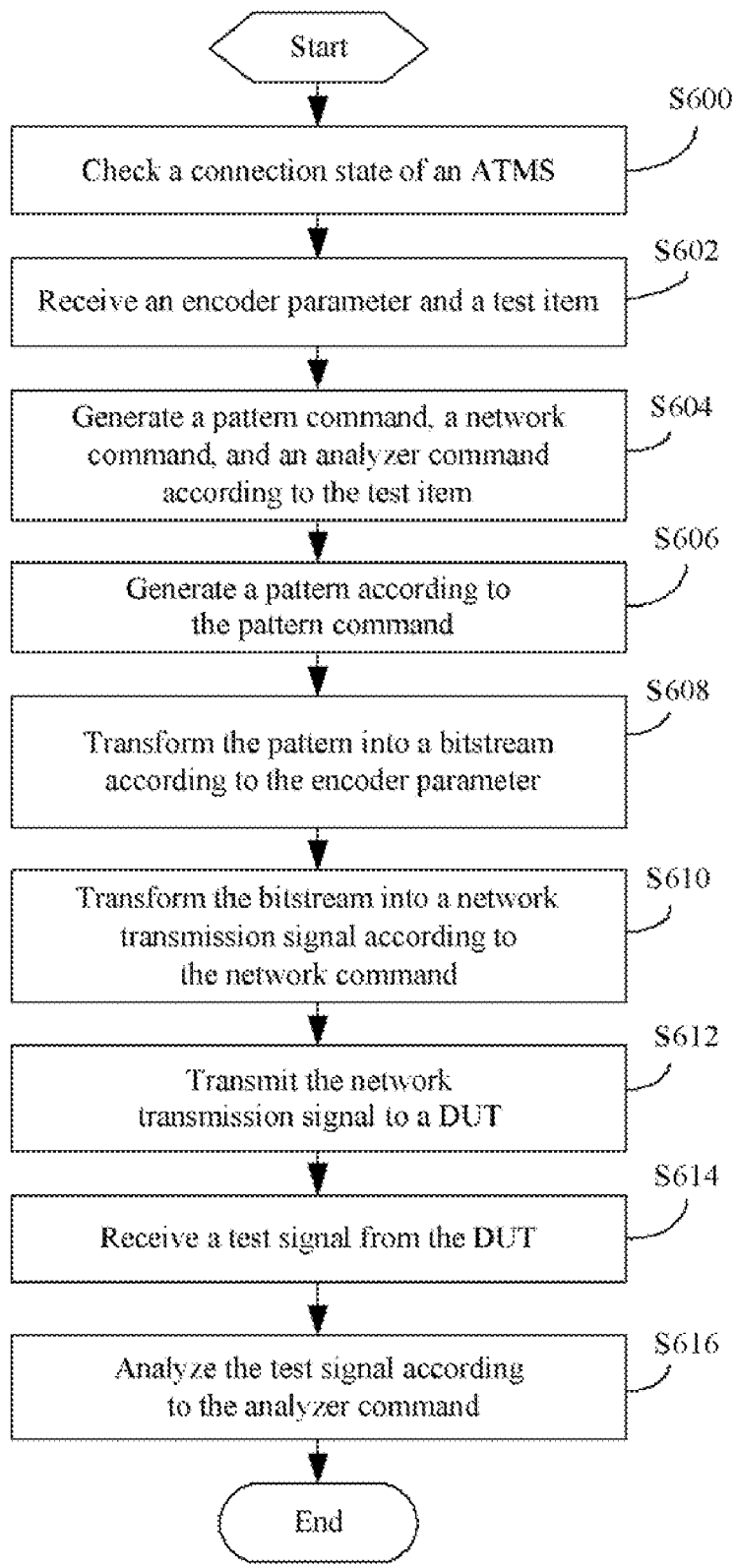
FIG. 6 is a flowchart of an automated test measurement method of yet another further exemplary embodiment of the present invention.

FIG. 6 is a flowchart of an automated test measurement method of another exemplary embodiment of the present invention. In the exemplary embodiment, the ATMS 100a automatically measures performance of the DUT 60.

In step S600, the control module 110 checks a connection state of the ATMS 100a. In step S602, the control module 110 receives an encoder parameter and a test item. In step S604, the control module 110 generates a pattern command, a network command and an analyzer command according to the test item.

In step S606, the signal generation module 120 generates a pattern according to the pattern command. In step S608, the encoder module 130 transforms the pattern into a bitstream according to the encoder parameter.

In step S610, the network simulation module 150 transforms the bitstream into a network transmission signal according to the network command. In step S612, the network simulation module 150 transmits the network transmission signal to the DUT 60. Then, the network transmission signal is transformed into a test signal.

In step S614, the signal analyzer module 140 receives the test signal from the DUT 60. In step S616, the signal analyzer module 140 analyzes the test signal according to the analyzer command.

Figure 7:
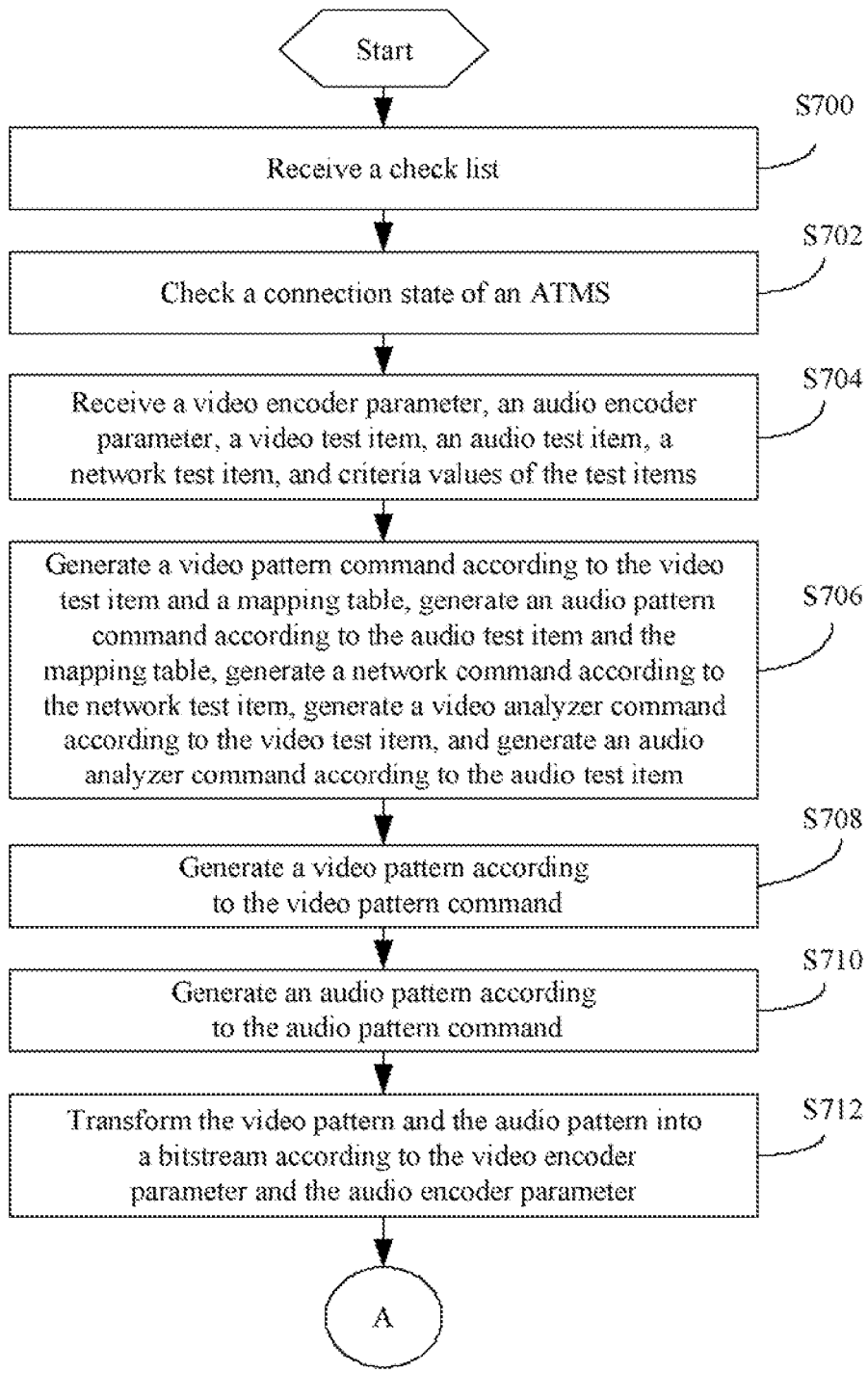
FIG. 7 is a detailed flowchart of part of the automated test measurement method of FIG. 6.
Figure 8:
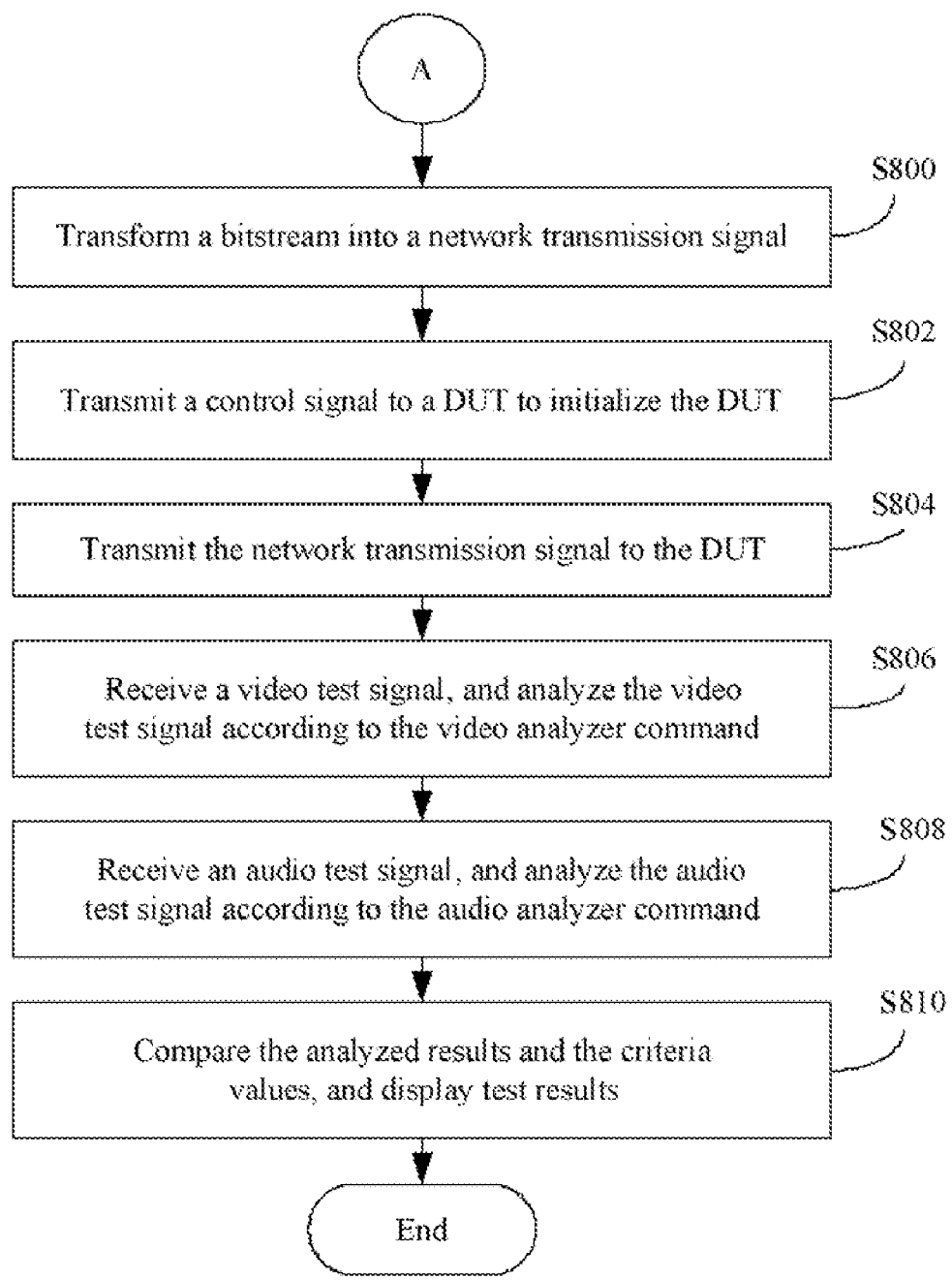
FIG. 8 is a detailed flowchart of part of the automated test measurement method of FIG. 6.

Referring to FIGS. 7 and 8, FIG. 7 is a detailed flowchart of the automated test measurement method from step S600 to step S608 of FIG. 6, and FIG. 8 is a detailed flowchart after a node A of FIG. 7, namely a detailed flowchart of the automated test measurement method from step S610 to step S616 of FIG. 6.

In step S700, the receiving submodule 111 receives a check list.

In step S702, the checking submodule 112 checks a connection state of the ATMS 100a according to the check list. In the exemplary embodiment, the checking submodule 112 checks connection states of the video source 20, the audio source 30, the realtime encoder 40, the transmission network 50, the DUT 60, the video analyzer 70, and the audio analyzer 80 included in the check list. The checking submodule 112 transmits request information to each device. If a reply is received from the device, the checking submodule 112 determines the connection state of the device is normal. If no reply is received from the device, the checking submodule 112 determines the connection state of the device is abnormal.

In another embodiment, the checking submodule 112 may only check connection states of one or more devices of the AMTS 100a, or may not check the connection state of each device.

In step S704, the receiving submodule 111 receives a video encoder parameter, an audio encoder parameter, a video test item, an audio test item, a network test item, and test criteria values of the test items.

In step S706, the command generation submodule 113 generates a video pattern command according to the video test item and the mapping table 116, generates an audio pattern command according to the audio test item and the mapping table 116, generates a network command according to the network test item, generates a video analyzer command according to the video test item, and generates an audio analyzer command according to the audio test item.

In step S708, the video generation submodule 121 generates the video pattern according to the video pattern command.

In step S710, the audio generation submodule 122 generates the audio pattern according to the audio pattern command. In this embodiment, the video pattern and the audio pattern are analog signals.

In the exemplary embodiment, step S708 and step S710 may be executed simultaneously, or one after the other.

In step S712, the encoder module 130 transforms the video pattern and the audio pattern into a bitstream according to the video encoder parameter and the audio encoder parameter. In the exemplary embodiment, the bitstream is a digital signal. Then, the process goes to a node A.

FIG. 8 is a flowchart after the node A of FIG. 7.

In step S800, the network simulation module 150 transforms the bitstream into a network transmission signal according to the network command. In the exemplary embodiment, the network simulation module 150 may simulate an Internet protocol (IP) network, a digital cable network, a digital terrestrial network, a satellite network, etc. Correspondingly, the network simulation network 150 can select an applicable channel or an applicable modulation method to transform the bitstream into the network transmission signal such as IP packets or modulation signals according to the network command.

In step S802, the infrared control submodule 114 transmits a control signal to the DUT 60 to initialize the DUT 60.

In other embodiments, the infrared control submodule 114 may transmits the control signal to the DUT 60 to initialize the DUT 60 before the encoder module 130 transforms the pattern into the bitstream.

In step S804, the network simulation network 150 transmits the network transmission signal to the DUT 60. Then the DUT 60 receives the network transmission signal, and transforms the network transmission signal into a test signal. The test signal includes a video test signal and an audio test signal.

In step S806, the video analyzer submodule 141 receives the video test signal from the DUT 60, and analyzes the video test signal according to the video analyzer command.

In step S808, the audio analyzer submodule 142 receives the audio test signal from the DUT 60, and analyzes the audio test signal according to the audio analyzer command.

In step S810, the comparing and displaying submodule 115 compares the analyzed results of the video analyzer submodule 141 and the audio analyzer submodule 142 and the test criteria values received by the receiving submodule 111, and displays test results. In the exemplary embodiment, if the analyzed result of one test item satisfies the test criteria value of the test item, the comparing and displaying submodule 115 displays a successful test result. If the analyzed result of one test item does not satisfy the test criteria value of the test item, the comparing and displaying submodule 115 displays an unsuccessful test result. Thus, the ATMS 100a finishes automatically measuring performance of the DUT 60.

In the embodiments of the present invention, the ATMSs 100 and 100a automatically measure performance of the DUT 60, and accordingly time for measuring performance of the DUT 60 is reduced, thereby reducing time for products of the DUT 60 to market. In addition, reliability, repetition, and consistency of measurement results are ensured.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. An automated test measurement system (ATMS), for automatically measuring a device under test (DUT), comprising:
   a control module, for receiving an encoder parameter and a test item, and generating a pattern command and an analyzer command according to the test item, wherein the control module comprises a receiving submodule, for receiving the encoder parameter and the test item;
   a signal generation module, for generating a pattern according to the pattern command;
   an encoder module, for transforming the pattern into a bitstream according to the encoder parameter, and transmitting the bitstream to the DUT, wherein the bitstream is then transformed into a test signal, wherein the encoder parameter comprises a video encoder parameter and an audio encoder parameter, the test item comprises a video test item, an audio test item, and test criteria values of the test items, the pattern command comprises a video pattern command and an audio pattern command, and the analyzer command comprises a video analyzer command and an audio analyzer command; and an analyzer module, for receiving the test signal from the DUT, and analyzing the test signal according to the analyzer command, wherein the control module further comprises a mapping table comprising a mapping relationship between the test items and the pattern, and a command generation submodule, for generating the video pattern command according to the video test item and the mapping table, generating the audio pattern command according to the audio test item and the mapping table, generating the video analyzer command according to the video test item, and generating the audio analyzer command according to the audio test item.

2. The ATMS as claimed in claim 1, wherein the pattern comprises a video pattern and an audio pattern; the signal generation module comprises a video generation submodule, for generating the video pattern according to the video pattern command, and an audio generation submodule, for generating the audio pattern according to the audio pattern command; the test signal comprises a video test signal and an audio test signal; the signal analyzer module comprises a video analyzer submodule, for analyzing the video test signal according to the video analyzer command, and an audio analyzer submodule, for analyzing the audio test signal according to the audio analyzer command.

3. The ATMS as claimed in claim 2, wherein the control module further comprises a comparing and displaying submodule, for comparing the analyzed results of the signal analyzer module with the test criteria values received by the receiving submodule, and displaying test results according to the compared result.

4. The ATMS as claimed in claim 1, wherein the receiving submodule further receives a check list, and the control module further comprises a checking submodule, for checking a connection state of the ATMS according to the check list.

5. The ATMS as claimed in claim 1, wherein the receiving submodule further receives a network test item; the control module further generates a network command according to the network test item; the ATMS further comprises a network simulation module, for transforming the bitstream into a network transmission signal according to the network command, and transmitting the network transmission signal to the DUT.

6. The ATMS as claimed in claim 1, wherein the control module comprises an infrared control submodule, for communicating with and controlling the DUT.

7. An automated test measurement method, for automatically measuring a device under test (DUT), comprising:
receiving an encoder parameter and a test item, wherein the encoder parameter comprises a video encoder parameter and an audio encoder parameter, the test item comprises a video test item, an audio test item, and test criteria values of the test items, the pattern command comprises a video pattern command and an audio pattern command, and the analyzer command comprises a video analyzer command and an audio analyzer command;
providing a mapping table comprising a mapping relationship between the test items and the pattern;
generating the video pattern command according to the video test item and the mapping table;
generating the audio pattern command according to the audio test item and the mapping table;
generating the video analyzer command according to the video test item;
generating the audio analyzer command according to the audio test item;
generating a pattern according to the video pattern command and the video pattern command;
transforming the pattern into a bitstream according to the encoder parameter;
transmitting the bitstream to the DUT, wherein the bitstream is then transformed into a test signal;
receiving the test signal from the DUT; and
analyzing the test signal according to the analyzer command.

8. The automated test measurement method as claimed in claim 7, wherein the step of generating a pattern according to the pattern command comprises generating a video pattern according to the video pattern command and generating an audio pattern according to the audio pattern command; the analyzing step comprises analyzing a video test signal according to the video analyzer command and analyzing an audio test signal according to the audio analyzer command.

9. The automated test measurement method as claimed in claim 8, further comprising comparing the analyzed results with the test criteria values, and displaying test results according to the compared result.

10. The automated test measurement method as claimed in claim 7, further comprising receiving a check list and checking a connection state of an ATMS according to the check list.

11. The automated test measurement method as claimed in claim 7, further comprising receiving a network test item, generating a network command according to the network test item, transforming the bitstream into a network transmission signal according to the network command, and transmitting the network transmission signal to the DUT.

12. The automated test measurement method as claimed in claim 7, further comprising transmitting a control signal to the DUT to initialize the DUT.

* * * * *